Patented Mar. 15, 1932

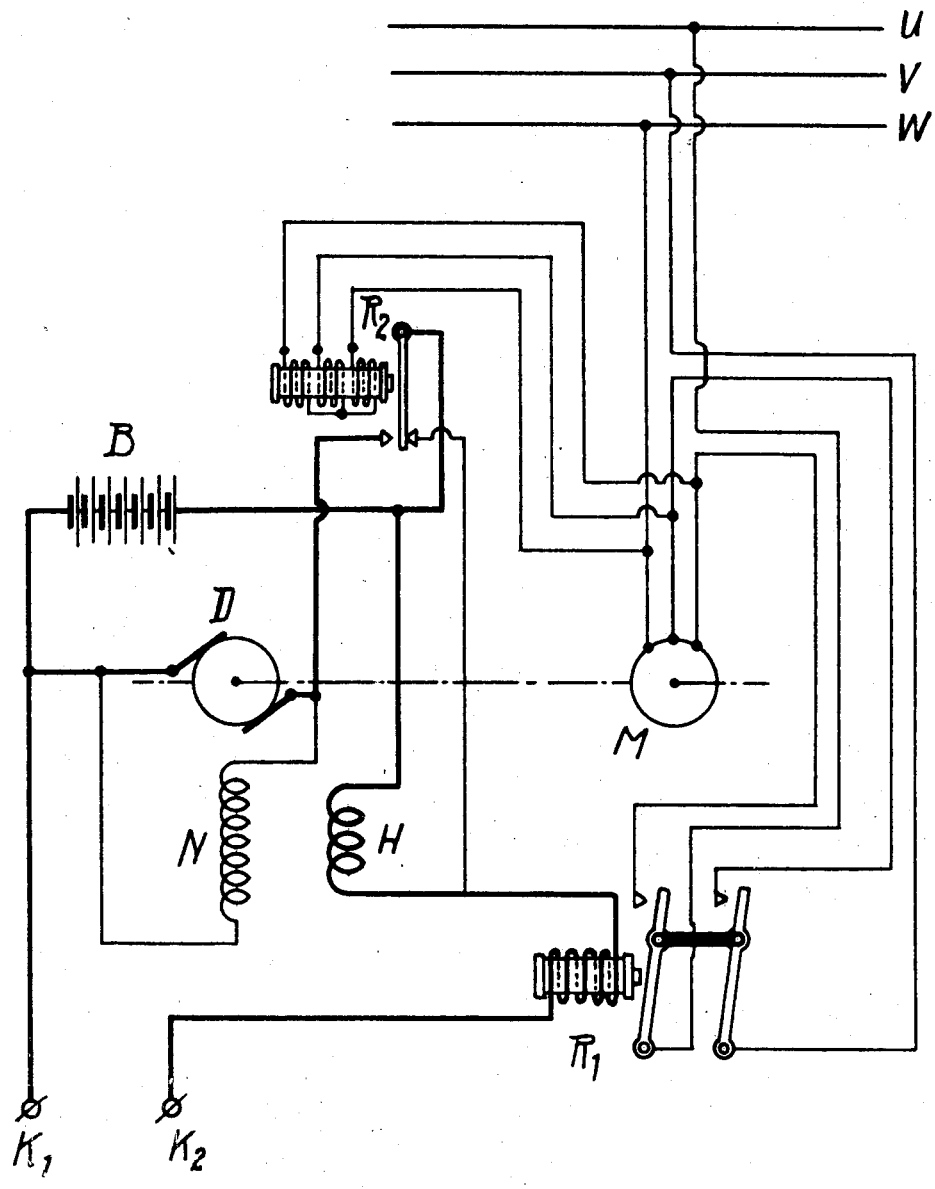

1,849,336

UNITED STATES PATENT OFFICE

KARL SCHMIDT, OF BERLIN-LICHTENRADE, GERMANY, ASSIGNOR TO C. LORENZ AKTIENGESELLSCHAFT, OF BERLIN-TEMPELHOF, GERMANY

ELECTRIC SUPPLY SYSTEM

Application filed June 21, 1928, Serial No. 287,074, and in Germany June 25, 1927.

This invention relates to electric supply systems and is more particularly directed to means for supplying electric consuming apparatus having a varying demand of load. This, for instance, is the case in telephone plants where the demand of current for the operation of the microphones, relays, etc. is dependent largely upon the traffic.

The object of this invention is to provide a supply system which adapts itself automatically to the demand of load, thus securing high-efficiency operation and reliability of service.

Another object of this invention is to combine a storage battery and a dynamo in such a manner that during normal traffic the dynamo takes the load, and the battery acts only as a reserve; and that, furthermore, with a comparatively small load the battery alone serves as a source of supply. In this way the dynamo is prevented from running during periods of excessively small loads or during absence of load.

These and further objects of my invention will be described with more detail in the following disclosure with reference to the accompanying drawing which shows one form of embodiment of the invention and which, it is understood, is liable to further modifications as embraced in the appended claims.

Referring to the drawing D represents the dynamo which is driven, in the example shown, by a three-phase motor M as a prime mover, which will be preferred in most practical cases on account of its simplicity and ease of operation. Reference characters $u$, $v$, $w$, designate the three-phase mains from which the motor M is supplied. Battery B is connected in parallel to the dynamo D in series with the contacts of a relay $R_2$. Furthermore, a load circuit is connected to the dynamo terminals at points $K_1$ and $K_2$ in series with an auxiliary compound winding H and a winding of an overload relay $R_1$. Reference character N is the normal shunt exciting winding of the dynamo. The operation of the machine M is controlled by the overload relay $R_1$. The relay $R_1$ is designed in such a way that it is operated only when the current in the load circuit has reached a minimum value, and is released as soon as the current in the load circuit becomes smaller than such minimum value. In order to prevent the dynamo when in a state of rest from being driven as a motor in a reverse sense by the battery, a so-called reverse current relay could be provided in the battery leads. However, such a relay appears to be more or less unreliable for operation in practical service, and according to the system of this invention an ordinary relay $R_2$ is provided for this purpose. This relay serves to connect and disconnect the battery in accordance with the starting and stopping of the prime mover M, or in other words, in dependence on the operation of relay $R_1$.

According to a further feature of this invention, the relay $R_2$ is used at the same time to short circuit the auxiliary compound winding H in case the dynamo is in a state of rest, so that when the battery alone is supplying the load, the load current need not flow through the compound winding and cause unnecessary losses.

The operation of the system as heretofore described takes place as follows:

In the condition as shown in the drawing it is supposed that there is no demand, or no considerable demand of load current. In a case where the demand of load current increases, at first (for instance with increasing traffic within a telephone plant) the battery B will take the load for small demand, for which purpose it is connected to the load circuit across the contacts of relay $R_2$ shown in a closed position in the drawing. This relay at the same time short circuits the compound winding H. Whenever the load current reaches a certain minimum value, which may be chosen at will by the design and adjustment of the relay $R_1$, then the latter will be actuated and will close its contacts, whereby the motor M is connected to its supply mains through the closing of the relay contacts. At the same time relay $R_2$ is excited and connects the dynamo to the load circuit and removes the short circuit of the compound winding H. Thus the latter is put in series with the load circuit. On account of the compound action of winding H the dynamo will now normally take the load and at the same time charge the battery which serves only to take excessive peak loads. In a case where the load current becomes smaller than the minimum current necessary for holding the relay $R_1$ in its working position, the motor M will be disconnected from its supply and stopped, as will be readily understood. Thus, relay $R_2$ will be released so that the original conditions will be restored. The same thing holds when through some cause the supply voltage suddenly disappears, whereby also the battery will automatically be disconnected from the dynamo and take the load, and thus prevent an interruption of service. In a preferred form, relay $R_2$ is provided with three windings excited by the three phases of the motor supply means. This has the advantage that noises and vibrations occurring with one phase supply are prevented and furthermore that the relay will be released and the dynamo disconnected from the battery, for instance, when only the voltage of one supply phase breaks down. In this latter case, as is well known, the motor would be stopped and the relay $R_2$ would only be released if it were supplied by this particular phase which would not always be the case in practice. With a three-phase winding of the relay this latter will always be released independently of what phase of supply current breaks down.

It will be understood that instead of a three phase prime mover, any other kind of prime mover, for instance, a direct current motor, may be employed.

Having described my invention, what I believe to be new and desire to secure and protect by Letters Patent of the United States is:

1. In an electric direct current supply system, comprising a shunt wound dynamo, a storage battery, a load circuit connected to the terminals of said battery including an auxiliary exciting winding of said dynamo, a shunt circuit for normally short-circuiting said winding, an electric motor for driving said dynamo, an overload relay in said load circuit having contacts operated at a minimum limit value of the current in said load circuit and controlling said motor for starting and stopping said dynamo, and a second relay having its winding connected to the terminals of said motor for automatically switching said dynamo across said load circuit when said dynamo is started and for maintaining the said shunt circuit open while the dynamo is in operation.

2. In an electric direct current supply system, comprising a shunt wound dynamo, a storage battery, a load circuit connected to the terminals of said battery including an auxiliary exciting winding of said dynamo, an electric three-phase motor for driving said dynamo, an overload relay in said load circuit having contacts operated at a minimum limit value of the current in said load circuit and controlling said motor for starting and stopping said dynamo, a second relay having contacts included in said connecting leads of said battery and having a three-phase winding connected to the terminals of said motor to automatically disconnect said dynamo from said battery when the dynamo is in a state of rest, and a further contact associated with said second relay to short circuit said auxiliary winding upon disconnection of said dynamo from said battery.

3. In combination, an electric circuit, a storage battery for supplying current to said circuit, a dynamo normally at rest, a compound winding for said dynamo in said circuit, a shunt circuit for normally short circuiting said compound winding, means responsive to a predetermined load on said circuit for starting said dynamo into operation and means for opening the shunt circuit around said compound winding and simultaneously switching the dynamo across said circuit.

4. In combination, an electric circuit, a storage battery for supplying current to said circuit, a dynamo normally at rest, a compound winding for said dynamo in said circuit, a shunt circuit for normally short circuiting said compound winding, means responsive to a predetermined load on said circuit for starting said dynamo into operation and means controlled by said last mentioned means for opening the shunt circuit around said compound winding and simultaneously switching the dynamo across said circuit.

5. In combination, an electric circuit, a storage battery for supplying current to said circuit, a dynamo normally at rest, a prime mover for said dynamo, a compound winding for said dynamo in said circuit, a shunt circuit for normally short circuiting said compound winding, a relay responsive to a predetermined load on said circuit for starting said prime mover into operation and a relay for opening the shunt circuit around said compound winding and simultaneously switching the dynamo across said circuit.

6. In combination, an electric circuit, a storage battery for supplying current to said circuit, a dynamo normally at rest, an electric motor driving said dynamo, a compound winding for said dynamo in said circuit, a shunt circuit for normally short circuiting said compound winding, a relay responsive to a predetermined load on said circuit for starting said motor into operation and a second relay controlled by said first mentioned relay for opening the shunt circuit around said compound winding and simultaneously switching the dynamo across said circuit.

In testimony whereof I have affixed my signature.

KARL SCHMIDT.